US008219118B2

(12) United States Patent
Kim et al.

(10) Patent No.: US 8,219,118 B2
(45) Date of Patent: Jul. 10, 2012

(54) METHOD AND APPARATUS FOR DECODING PAGING MESSAGE IN WIRELESS COMMUNICATION SYSTEM

(75) Inventors: Hee-Su Kim, Seongnam-si (KR); Dong-Wook Seo, Suwon-si (KR); Il-Yong Jong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1051 days.

(21) Appl. No.: 11/566,753

(22) Filed: Dec. 5, 2006

(65) Prior Publication Data
US 2007/0184866 A1     Aug. 9, 2007

(30) Foreign Application Priority Data

Feb. 7, 2006    (KR) .................... 10-2006-0011651

(51) Int. Cl.
*H04W 68/00*         (2009.01)
(52) U.S. Cl. ............... 455/458; 455/434; 455/343.2; 455/574; 455/224; 455/509; 370/312; 370/235; 370/321; 370/337; 370/468; 370/347; 370/311; 370/335; 370/332; 370/552; 375/340; 375/343; 375/324; 375/347
(58) Field of Classification Search .......... 370/312, 370/235, 321, 337, 310.1, 349, 468, 347; 370/311, 335, 332, 442, 252; 455/515, 514, 455/434, 343.2, 574, 224, 509; 375/340, 375/343, 324, 347; 380/321, 201, 203, 282
See application file for complete search history.

(56) References Cited

U.S. PATENT DOCUMENTS

| | | | | |
|---|---|---|---|---|
| 5,815,507 A | * | 9/1998 | Vinggaard et al. | 714/704 |
| 5,910,949 A | * | 6/1999 | Bilstrom et al. | 370/337 |
| 6,378,106 B1 | * | 4/2002 | Allpress et al. | 714/795 |
| 6,407,993 B1 | * | 6/2002 | Moulsley | 370/347 |
| 6,587,389 B2 | * | 7/2003 | De Paor et al. | 365/222 |

(Continued)

FOREIGN PATENT DOCUMENTS

DE    198 13 507    9/1999

(Continued)

OTHER PUBLICATIONS

European Search Report from corresponding European Application No. 07002477.3.

*Primary Examiner* — Rafael Pérez-Gutiérrez
*Assistant Examiner* — Joseph Arévalo
(74) *Attorney, Agent, or Firm* — F. Chau & Associates, LLC

(57) ABSTRACT

A method and mobile device for decoding a paging message transmitted as multiple bursts in a wireless communication system are provided. In the method, only the first burst among four bursts of a transmitted paging message is received and equalized. The equalized first burst is compared (e.g., by computing correlation) with a reference paging message. The first comparison result value obtained from the first comparison is compared with a threshold value. If the first comparison result value is greater than the threshold value, second through fourth bursts of the paging message are not received, and a previous decoded paging message is output and a sleep state is entered. If the comparison result value is not greater than the threshold value, the second through fourth bursts are received and decoded, the decoded paging message is encoded, and a first burst of the encoded paging message is stored as the reference paging message.

6 Claims, 5 Drawing Sheets

U.S. PATENT DOCUMENTS

| | | | |
|---|---|---|---|
| 7,164,739 B1 * | 1/2007 | Trott | 375/347 |
| 7,257,095 B2 * | 8/2007 | Liu | 370/311 |
| 2002/0172160 A1 * | 11/2002 | Moulsley | 370/252 |
| 2004/0207763 A1 * | 10/2004 | Ciardi | 348/723 |
| 2005/0030914 A1 * | 2/2005 | Binzel et al. | 370/312 |
| 2005/0113087 A1 | 5/2005 | Rick et al. | 455/434 |
| 2005/0122925 A1 | 6/2005 | Chitre et al. | 370/310.1 |
| 2005/0175123 A1 * | 8/2005 | Gurney et al. | 375/324 |
| 2006/0062394 A1 * | 3/2006 | Kamijo | 380/282 |
| 2006/0104204 A1 * | 5/2006 | Hansson et al. | 370/235 |
| 2007/0133797 A1 * | 6/2007 | Schipper et al. | 380/231 |
| 2007/0184866 A1 * | 8/2007 | Kim et al. | 455/515 |

FOREIGN PATENT DOCUMENTS

| | | |
|---|---|---|
| EP | 0 473 465 | 3/1992 |
| EP | 0 673 175 | 9/1995 |
| EP | 1 294 206 | 3/2003 |
| EP | 1 389 883 | 2/2004 |
| JP | 03-065830 | 3/1991 |
| JP | 05-095315 | 4/1993 |
| JP | 2001-186077 | 7/2001 |
| JP | 2005-229150 | 8/2005 |
| KR | 1020010020092 | 3/2001 |
| KR | 1020050083464 | 8/2005 |
| WO | 2004086294 | 10/2004 |
| WO | 2005055640 | 6/2005 |

* cited by examiner

METHOD AND APPARATUS FOR DECODING PAGING MESSAGE IN WIRELESS COMMUNICATION SYSTEM

BACKGROUND OF THE INVENTION

This application claims priority under 35 U.S.C. §119 of Korean Patent Application No. 10-2006-0011651, filed on Feb. 7, 2006, the entire contents of which are hereby incorporated by reference herein.

FIELD OF THE INVENTION

The present invention relates to a decoding method and apparatus, and more particularly, to a method and mobile device for decoding a transmitted paging message with a reduced decoding time in a wireless communication system, and a recording medium for recording a program for executing the method.

DESCRIPTION OF THE RELATED ART

A mobile device (e.g., a cell phone or other mobile communication terminal) in a wireless communication system (e.g., a mobile communication system) is usually designed to perform one mode among a variety of modes such as an active mode and an idle mode. In the active mode, the mobile device transmits and receives data, for example, audio, video, or data, to and from at least one base station in the wireless communication system. In the idle mode referred to as a standby mode, the mobile device periodically monitors a paging channel to obtain paging messages.

In the Global System for Mobile Communications (GSM) system standard, voice data are digitized and the digital data are compressed, and the compressed digital data are transferred through a single channel together with the voice data of other users, but the voice data of each user is transferred within a unique timeslot (i.e., time division multiplexing). The GSM standard is becoming a core system of the 3rd Generation Partnership Project (3GPP) for developing a third-generation (3G) phone standard, namely the International Mobile Telecommunications-2000 (IMT-2000) standard.

In Europe, the GSM standard has been adopted as the standard for mobile communication systems, and there are more than one billion subscribers using the GSM standard throughout the world in more than 120 countries. Generally, in a mobile communication system network, such as that of the GSM standard, a mobile device (e.g., cell-phone) periodically monitors and processes paging messages. The mobile device periodically monitors a broadcast control channel (BCC) to obtain paging messages and updates its system parameters.

Even while a mobile device is in the idle mode, messages output from base stations are transmitted to and received by the mobile device through a paging channel. In the GSM system unique time division multiple access (TDMA) frames are allocated to the mobile device for the paging channel. Messages are transmitted to the mobile device using these TDMA frames. In the GSM communications networks, the mobile device receives Paging Channel (PCH) information transmitted in a series of four bursts in corresponding timeslots of consecutive time division multiple access (TDMA) frames. A paging message is a message that is transmitted through the paging channel (PCH). The PCH is a control channel used for paging a mobile device when there is an incoming call addressed to the mobile device. A base station uses a paging channel (PCH) to call an individual mobile device within its current cell.

Every message on the PCH channel addressed to a mobile device contains the paged mobile device identity number, such as the International Mobile Subscriber Identity (IMSI), or Temporary Mobile Subscriber Identity (TIMSI). In the case where no mobile device is being paged, a "no mobile ID paging message", (or "No Identity Page") is sent on the PCH channel. At the mobile device, the decoded PCH burst data may indicate that the mobile device is being paged, or that another mobile device is being paged, or that no mobile device is being paged. Thus in some instances the paging message is addressed to the mobile device, or a "no mobile ID" paging message not addressed to any device. In a GSM system, paging messages are transmitted on the Paging Channel (PCH), which is a control channel. The paging message consists of 184 information bits which are encoded into 456 bits. An interleaver in the base station's transmitter interleaves the 456 bits over four bursts according to the following rule:

$i(B,j)=c(n,k)$ for $k=0,1,\ldots,455$ where $n=0,1,\ldots$, $B=B.\text{sub}.0+4n+(k \bmod 4)$ $j=2((49k \bmod 57)+(k \bmod 8)) \text{div } 4)$.

The encoded 184 bits of the paging message is thus split into four bursts which are sent in different TDMA frames. In the GSM system, a paging message block is transmitted at intervals of 0.5-2 seconds while the length of the actual block is about 20 milliseconds (the block contains four bursts of 0.577 ms each, where the gap between each burst is 4.615 ms). For more information, the interested reader can refer to GSM 04.08; "Digital cellular telecommunications system (Phase 2+); Mobile radio interface layer 3 specification", version 7.8.0, Release 1998, and GSM 05.03; "Digital cellular telecommunications system (Phase 2+); Channel coding", version 8.3.0, Release 1999.

In the GSM system, a mobile device periodically monitors its paging channel (PCH) to obtain messages output from base stations. In order to receive a paging message transmitted through the paging channel (PCH) the conventional mobile device wakes up from a "steep state" before the mobile device receives a first TDMA frame, enters an "awake state", and receives all of (or at least two of) the four bursts transmitted as the paging message. To recover the paging message, the conventional mobile device processes, (i.e., receives, equalizes, and decodes), al four of (or at least two of) the four bursts. Thereafter, when other additional communication is not needed, the mobile device goes back to the "sleep state".

In the idle mode, the mobile device continuously consumes power in order to sustain circuits necessary to monitor paging messages output from base stations in the wireless communication system. The mobile device which is portable is supplied with power by an internal battery having a limited capacity. Accordingly, power consumption of the mobile device in the idle mode reduces the available power of the internal battery.

As the portability of the communication devices become increasingly important, it is important that the power consumption of such devices be minimized and the battery life be increased. However the conventional methods of have not been able to minimize the power consumption of the battery in the mobile device.

Accordingly, it is desirable to reduce power consumed by a mobile device in the "sleep state" and in the "awake state". Since the duration of the "sleep state" is typically much longer than the duration of the "awake state", it is especially desirable to minimize power consumption of the mobile device in the idle mode, and particularly, in the "sleep state" in order to effectively conserve the limited power available from the internal battery of the mobile device.

SUMMARY OF THE INVENTION

The present invention provides a method and mobile device for decoding a paging message with a reduced decoding time in a wireless communication system, and a recording medium for recording a program for executing the method.

According to an aspect of the present invention, there is provided a method of decoding a paging message in a wireless communication system. The method includes the following steps: receiving and equalizing only the first burst among the four bursts of a transmitted paging message, performing a first comparison comparing the equalized first burst with a reference paging message, performing a second comparison comparing the first comparison result value obtained from the first comparison with a threshold value, and determining whether to receive the second through fourth bursts of the paging message based on the result of the second comparison comparing the first comparison result value and the threshold value.

The step of determining whether to receive the second through fourth bursts includes entering a steep state without receiving the second through fourth bursts of the paging message if the comparison result value is greater than the threshold value.

The step of determining whether to receive the second through fourth bursts includes receiving the second through fourth bursts of the paging message if the comparison result value is equal to or less than the threshold value.

The step of comparing the equalized first burst with the reference paging message includes performing correlation of the equalized first burst and the reference paging message or comparing the equalized first burst with the reference paging message bit to bit to obtain a bit difference.

According to another aspect of the present invention, there is provided a method of decoding a paging message in a wireless communication system. The method includes receiving and equalizing only a first burst among four bursts of a transmitted paging message, comparing the equalized first burst with each of a plurality of reference paging messages, selecting a maximum value from among comparison result values, determining whether the maximum value is the same as a no mobile ID paging message, and determining whether to receive the second through fourth bursts of the paging message based on a result of the determination.

According to still another aspect of the present invention, there is provided a method of decoding a paging message in a wireless communication system. The method includes receiving and equalizing a first burst of a paging message including four bursts, determining whether the equalized first burst is the same as a no mobile ID paging message, and determining whether to receive the second through fourth bursts of the paging message based on a result of the determination.

According to yet another aspect of the present invention, there is provided a mobile device including a receiver, an equalizer, and a controller. The receiver receives at least one burst among four bursts of a paging message in response to a control signal. The equalizer equalizes a burst output from the receiver. The controller compares a first burst equalized by the equalizer with a reference paging message, compares a comparison result value obtained from the comparison with a threshold value., and generates the control signal for controlling reception of second through fourth bursts of the paging message based on a result of comparing the comparison result value with the threshold value.

The controller outputs the control signal that is deactivated to the receiver to control the receiver not to receive the second through fourth bursts of the paging message if the comparison result value is greater than the threshold value.

The controller outputs the control signal that is activated to the receiver to control the receiver to receive the second through fourth bursts of the paging message if the comparison result value is equal to or less than the threshold value.

The mobile device may further include a decoder, a storage unit, a reference paging message generator, and a selection circuit. The decoder decodes first through fourth bursts equalized by the equalizer. The storage unit stores a paging message decoded by the decoder. The reference paging message generator encodes first through fourth bursts of a decoded paging message stored in the storage unit and provides the encoded first burst as the reference paging message. The selection circuit outputs a decoded paging message stored in the storage unit or a decoded paging message output from the decoder in response to a selection signal output from the controller.

The controller may perform correlation of the first burst equalized by the equalizer and the reference paging message, compare a result value of the correlation with the threshold value, and generate the control signal for controlling the reception of the second through fourth bursts of the paging message based on a result of comparing the correlation result value with the threshold value.

Alternatively, the controller may compare the first burst equalized by the equalizer with the reference paging message bit to bit, compare a bit difference obtained from the comparison with the threshold value, and generate the control signal for controlling the reception of the second through fourth bursts of the paging message based on a result of comparing the bit difference with the threshold value.

According to a further aspect of the present invention, there is provided a mobile device including a mobile device including a receiver, an equalizer, and a controller. The receiver receives at least one burst among four bursts of a paging message in response to a control signal. The equalizer equalizes a burst output from the receiver. The controller compares a first burst equalized by the equalizer with each of a plurality of reference paging messages, selects a maximum value from among a comparison result values obtained from the comparison, determines whether the maximum value is the same as a no mobile ID paging message, and generates the control signal for controlling reception of second through fourth bursts of the paging message based on a result of the determination.

The controller may output the control signal that is activated to the receiver if the maximum value is not the same as the no mobile ID paging message to control the receiver to receive the second through fourth bursts of the paging message. The mobile device may further include a decoder connected to the equalizer to decode a burst equalized by the equalizer.

The mobile device may further include a storage unit and a selection circuit. The storage unit stores the no mobile ID paging message. The selection circuit outputs the no mobile ID paging message stored in the storage unit or a decoded paging message output from the decoder in response to a selection signal output from the controller.

The attached drawings for illustrating preferred embodiments of the present invention are referred to in order to gain a sufficient understanding of the present invention, the merits thereof, and the objectives accomplished by the implementation of the present invention. Hereinafter the present invention will be described in detail by explaining preferred embodiments of the invention with reference to the attached drawings.

BRIEF DESCRIPTION OF THE DRAWINGS

The above and other features and advantages of the present invention will become more apparent by describing in detail preferred embodiments thereof with reference to the attached drawings in which, like reference numerals in the drawings denote like elements, and.

DETAILED DESCRIPTION OF EXEMPLARY EMBODIMENTS OF THE INVENTION

Figure 1:
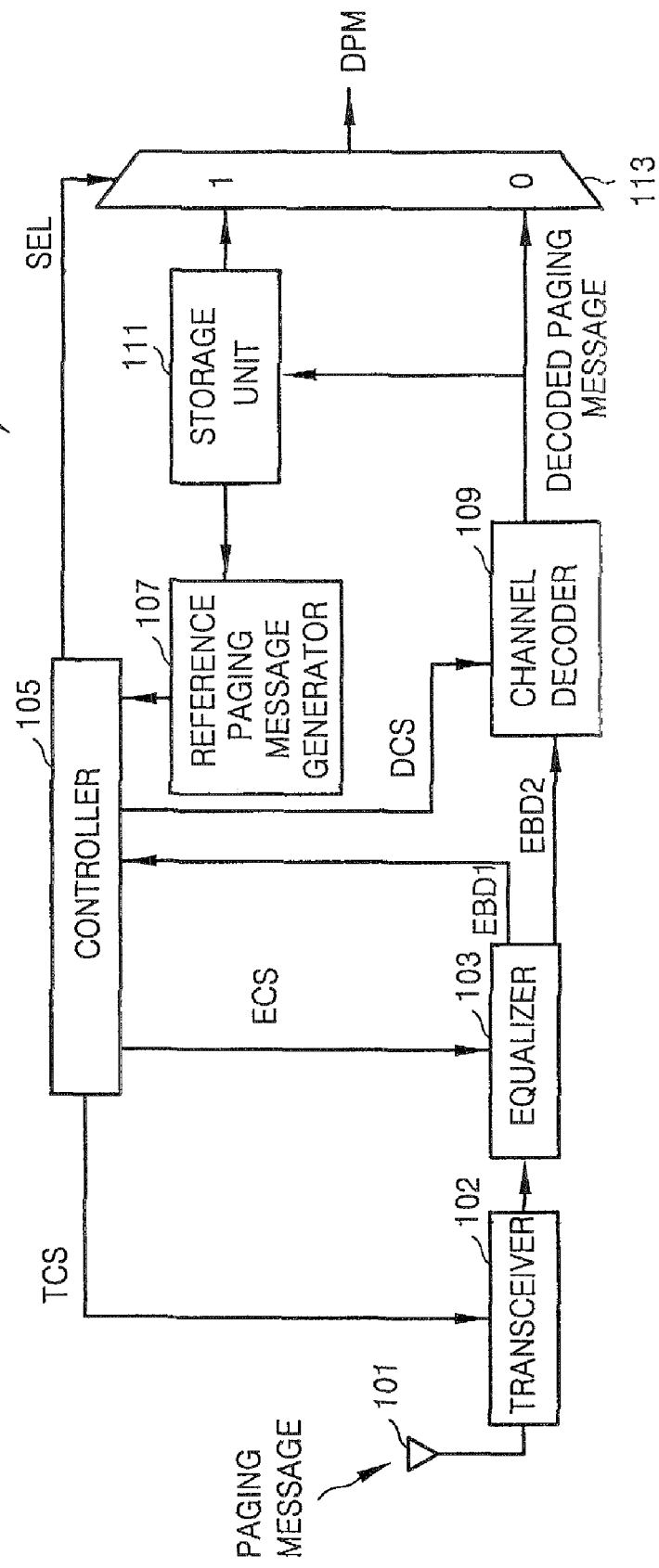
FIG. 1 is a block diagram of a receiver circuit in a mobile device according to an embodiment of the present invention.

FIG. 1 is a block diagram of a receiver circuit in a mobile device 100 according to an embodiment of the present invention. The mobile device 100 includes a transceiver (or a receiver) 102, an equalizer 103, a controller 105, a reference paging message generator 107, a channel decoder 109, a storage unit 111, and a selection circuit 113. The mobile device 100 is a communication terminal such as a mobile communication terminal or a personal digital assistant (PDA) having a mobile communication function.

The transceiver 102 wirelessly transmits and receives a signal (for example, in burst units) through an antenna 101. In particular, the transceiver 102 may receive through the antenna 101 at least one burst among four bursts of a paging message (i.e., a message transmitted over a paging channel) transmitted through a control channel from a base station. The control channel may be a paging channel in a Global System for Mobile Communications (GSM), a common control channel, a broadcast control channel, or a channel used as a control channel in another wireless communication system.

After receiving a first burst of the paging message, in response to a first control signal TCS output from the controller 105, the transceiver 102 may receive second through fourth bursts (for example, when the transceiver 102 is enabled) or stop receiving the second through fourth bursts (for example, when the transceiver 102 is disabled).

The equalizer 103 receives and equalizes a burst output from the transceiver 102 and outputs an equalized burst (e.g., equalized first burst EBD1 or equalized second burst EBD2). The equalizer 103 is enabled or disabled in response to a second control signal ECS output from the controller 105. For example, after equalizing only the first burst of the paging message, the equalizer 103 may sequentially equalize the second through fourth burst of the paging message in response to the (activated) second control signal ECS.

The controller 105 generates the first control signal TCS for enabling or disabling the transceiver 102, the second control signal ECS for enabling or disabling the equalizer 103, or a third control signal DCS for enabling or disabling the channel decoder 109. In addition, the controller 105 may output a selection signal SEL. The controller 105 receives the equalized first burst EBD1 (from the equalizer 103) and a reference paging message (from the reference paging message generator 107), performs a first comparison comparing them with each other to generate a first comparison value, performs a second comparison comparing the first comparison value obtained from the first comparison with a threshold value, and outputs the first control signal TCS to the transceiver based on a result of the second comparison.

In one implementation of the present invention, the controller 105 performs the first comparison by measuring the correlation of the equalized first burst EBD1 and the reference paging message, and performs the second comparison by comparing a result value (the first comparison value) of the correlation (the first comparison) with a predetermined threshold value, and outputs the first control signal TCS that is deactivated if the result value of the correlation is greater than the predetermined threshold value.

In another implementation of the present invention, the controller 105 performs the first comparison by comparing the equalized first burst EBD1 with the reference paging message bit to bit to obtain a bit difference (the first comparison value), and performs the second comparison by comparing the bit difference (the first comparison value) with a predetermined threshold value, and output the first control signal TCS that is deactivated to the transceiver 102 if the bit difference (the first comparison value) is greater than the predetermined threshold value. In that event, the transceiver 102 is disabled in response to the first control signal TCS that is deactivated and cannot receive the second through fourth bursts of the paging message input through the antenna 101. Thereafter, the controller 105 controls the mobile device 100 to enter a "sleep state". As a result, power consumption of the mobile device 100 in an idle state can be reduced.

The reference paging message used in the first comparison is obtained from storage unit 111. The storage unit 111 stores previously decoded paging message(s). The controller 105 outputs to the selection circuit 113 the selection signal SEL for outputting a selected previously stored decoded paging message stored in the storage unit 111. The selection circuit 113 outputs the selected previously stored decoded paging message as a decoded paging message DPM. The storage unit 111 may be implemented by a buffer, as a volatile memory device, as a non-volatile memory device, or as database, but the present invention is not limited thereto.

The reference paging message may be a paging message that does not include a mobile ID (hereinafter, referred to as a "no mobile ID paging message"). The no mobile ID paging message is a paging message from a base station that does not call any mobile device. The controller 105 may output the second and third control signals ECS and DCS to the equalizer 103 and to the channel decoder 109, respectively, to disable them, thus conserving power.

Since the mobile device 100 (e.g., particularly the equalizer 103 and the channel decoder 109) can enter the sleep state after receiving only the first burst of the paging message and outputting the previous decoded paging message as the decoded paging message DPM, power (electric current) consumed to process (for example, receive, equalize, and/or decode) the second through fourth bursts of the paging message is conserved.

If the result value of the correlation (or the result value of the bit difference) is equal to or less than the predetermined threshold values, the controller 105 outputs the (activated) first control signal TCS to the transceiver 102. Then, the transceiver 102 sequentially receives the second through fourth bursts of the paging message in response to the (activated) first control signal TCS. Thus, the controller 105 may output the second and third control signals ECS and DCS to the equalizer 103 and the channel decoder 109, respectively, to enable them. Additionally, the controller 105 outputs the selection signal SEL to the selection circuit 113 to output a selected (current or stored) output signal of the channel decoder 109.

The equalizer 103 may sequentially equalize the second through fourth bursts in response to the activated second control signal ECS and output the equalized first through fourth bursts EBD2 to the channel decoder 109. The channel decoder 109, enabled in response to the activated third control signal DCS, receives and decodes the equalized first through fourth bursts EBD2 output from the equalizer 103 and outputs a decoded paging message to the storage unit 111 and/or to the selection circuit 113. The storage unit 111 receives and stores the decoded paging message output from the channel decoder 109.

The reference paging message generator 107 receives and encodes the decoded paging message output from the storage unit 111 and stores the first burst of the encoded paging message as the reference paging message in a predetermined internal data storage device (e.g., register, not shown). The predetermined internal data storage device may be implemented by a buffer, a database, a FIFO, a RAM, or a register, but the present invention is not limited thereto.

The controller 105 receives the first burst of the current paging message and the reference paging message (i.e., the first burst of a paging message generated by encoding the previously stored decoded paging message), performs correlation of them (or compares them bit to bit to obtain a bit difference), compares a result value of the correlation (or the bit difference) with a threshold value, and generates the control signals TCS, ECS, and DCS for enabling or disabling the transceiver 102, the equalizer 103, and the channel decoder 109, respectively, based on a result of the second comparison. In this embodiment of the present invention, when a paging message is received, the mobile device 100 receives the first burst of the current paging message and compares the first burst of the current paging message with the first burst of a previous (i.e., previously stored) paging message. If a result value of the first comparison, i.e., a first comparison result value is greater than a threshold value, the mobile device 100 does not receive the second through fourth bursts of the current paging message and outputs the previous (i.e., previously stored) paging message stored in the storage unit 111.

However, if the first comparison result value is equal to or less than the threshold value, the mobile device 100 decodes additional bursts (e.g., all of the first through fourth bursts) of the current paging message and transmits the decoded current paging message to the storage unit 111 and/or to a subsequent block through the a selection circuit 113, the first comparison result value may be a value resulting from the correlation of the first burst of the current paging message and the first burst of the previous (i.e., previously stored) paging message or from a bit difference between the first burst of the current paging message and the first burst of the previous (i.e., previously stored) paging message.

Figure 2:
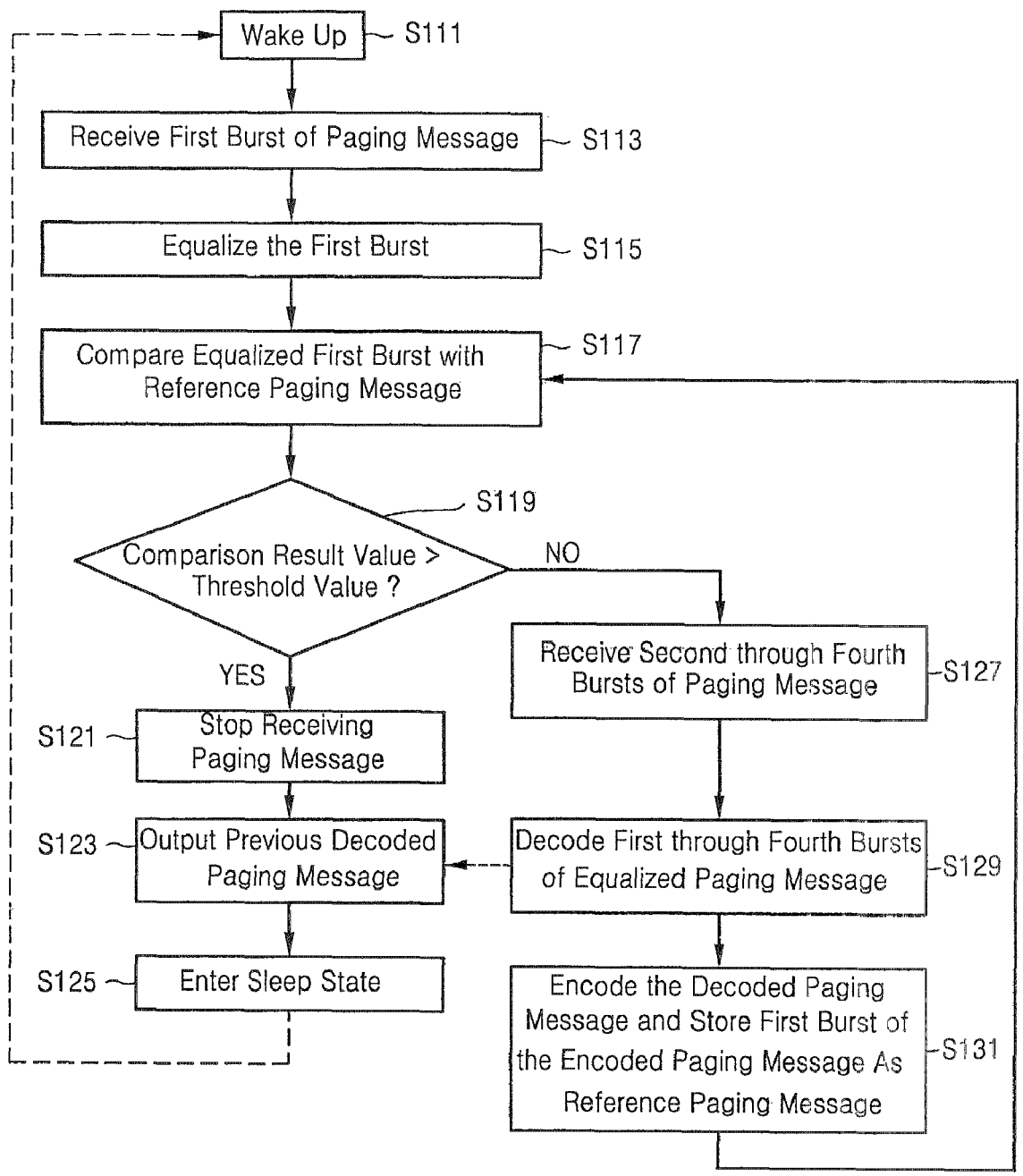
FIG. 2 is a flowchart of a method of decoding a transmitted paging message according to an embodiment of the present invention.

FIG. 2 is a flowchart of a method of decoding a transmitted paging message according to an embodiment of the present invention. The method, by which electrical current (power) consumed by at least one of the transceiver 102, the equalizer 103, and the channel decoder 109 is conserved and the amount of time taken to decode a paging message is reduced, will be described below with reference to FIGS. 1 and 2.

In step S111, the mobile device 100 wakes up from a sleep state to periodically monitor a paging channel (PCH). In next step S113, the transceiver 102 is enabled (in response to the activated first control signal TCS) and receives the first burst of a current paging message received through the paging channel.

In step S115, the equalizer 103 is enabled (in response to the activated second control signal ECS), equalizes the first burst output from the transceiver 102, and outputs the equalized first burst EBD1 to the controller 105. In an alternative embodiment, the equalizer 103 may output the equalized first burst EBD1 to both the controller 105 and to the channel decoder 109.

In step S117, the controller 105 receives and compares the equalized first burst EBD1 (of a current paging message received through the paging channel) with a (previously stored) reference paging message. In the comparison, the equalized first burst EBD1 and the reference paging message may be subjected to correlation or they may be compared bit to bit to obtain a bit difference therebetween. However, the present invention is not limited thereto.

In step S119, the controller 105 compares the comparison result value (i e., a result value of the correlation or a bit difference) with a threshold value. If the comparison result value is greater than the threshold value (branch "YES" from decision step S119), the controller 105 outputs the (deactivated) first control signal TCS to the transceiver 102 and thus the transceiver 102 is deactivated and stops receiving the second through fourth bursts of the paging message in response to the deactivated first control signal TCS output by the controller 105 in step S121. And, next, the controller 105 outputs the (activated) selection signal SEL, so that in step S123, the selection circuit 113 outputs a previous decoded paging message, (through a first input terminal "1", in response to the activated selection signal SEL). Next, in step S125, the mobile device 100 enters the sleep state. If the comparison result value is greater than the threshold value, the controller 105 may also output the deactivated first control signal TCS to the transceiver 102 and the deactivated third control signal DCS to the channel decoder 109.

If the comparison result value is equal to (or less than) the threshold value (branch "NO" from decision step S119), the controller 105 outputs the (activated) first control signal TCS that is to the transceiver 102; and, accordingly, in next step S127, the (activated) transceiver 102 sequentially receives the second through fourth bursts of the paging message in response to the (activated) first control signal TCS and outputs them to the (activated) equalizer 103.

The (activated) equalizer 103 sequentially equalizes the second through fourth burst of the paging message and outputs the equalized second through fourth bursts to the channel decoder 109, during an equalization step between steps S127 and S129. Alternatively, the (activated) equalizer 103 may output the equalized first through fourth bursts to the channel decoder 109.

In step S129, the channel decoder 109 receives and decodes the first through fourth bursts that have been equalized by the equalizer 103 in response to the third control signal DOCS (activated by the controller 105) and outputs a decoded paging message to the storage unit 111 and/or to the selection circuit 113. A previous (previously stored) decoded paging message stored in the storage unit 111 is replaced by the current decoded paging message. In step S131, the reference paging message generator 107 receives the decoded paging message stored in the storage unit 111, encodes the decoded paging message, and stores as the reference paging message at least the first burst of the encoded paging message in a predetermined internal data storage device (e.g., register). The predetermined internal data storage device may be a database, a random access memory (RAM) device, a FIFO, a register, or a flash memory device.

If the comparison result value is equal to (or less than) the threshold value (branch "NO" from decision step S119), the controller 105 outputs the (deactivated) selection signal SEL and the selection circuit 113 outputs the (current) paging message that has been decoded by the channel decoder 109 as an output signal DPM in response to the (deactivated) selection signal SEL.

In other words, when the current paging message is determined (through the above method) to be different from a previous paging message, the mobile device 100 decodes the current paging message, stores the decoded current paging message in the storage device 111, encodes (re-encodes) the decoded paging message stored in the storage unit 111, and stores the first burst of the encoded paging message in the predetermined data storage device (e.g., a buffer or register) as the reference paging message. However, when the current paging message is determined (through the above method) to be the same as the previous paging message, the mobile device 100 outputs the previous (i.e., previously stored) paging message without processing all four bursts of the current paging message.

Figure 3:
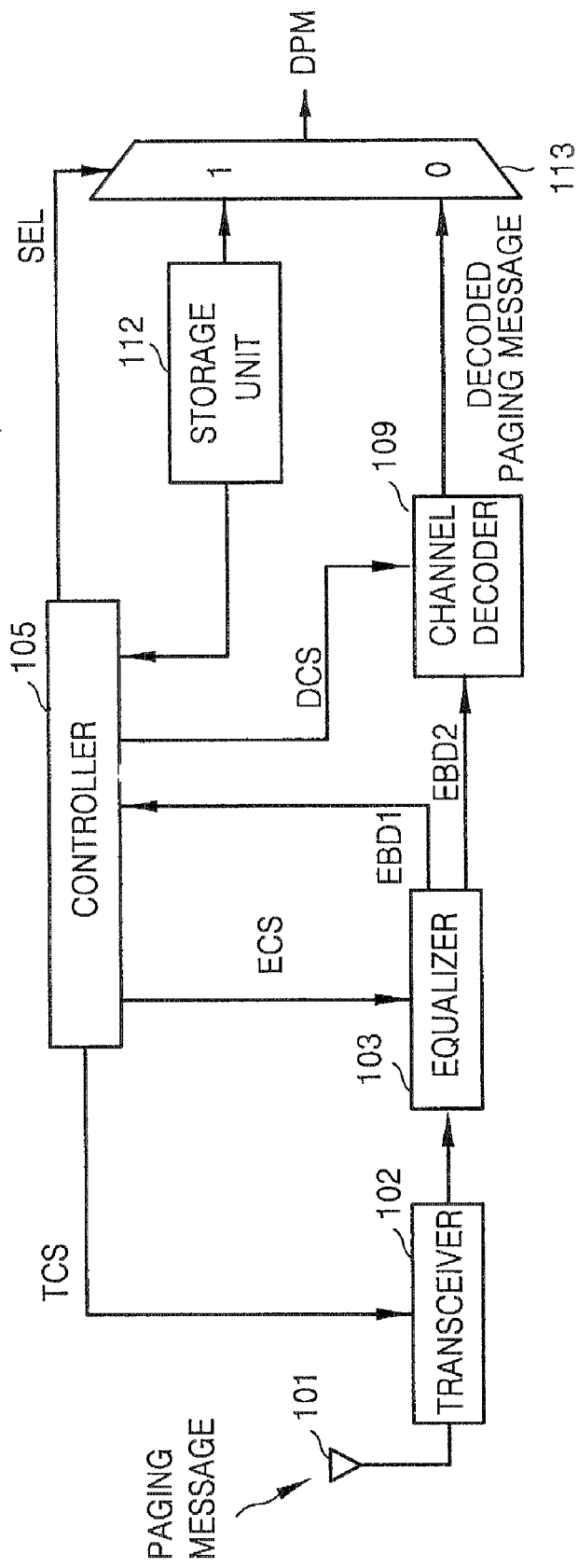
FIG. 3 is a block diagram of a receiver circuit in a mobile device according to another embodiment of the present invention.
Figure 4:
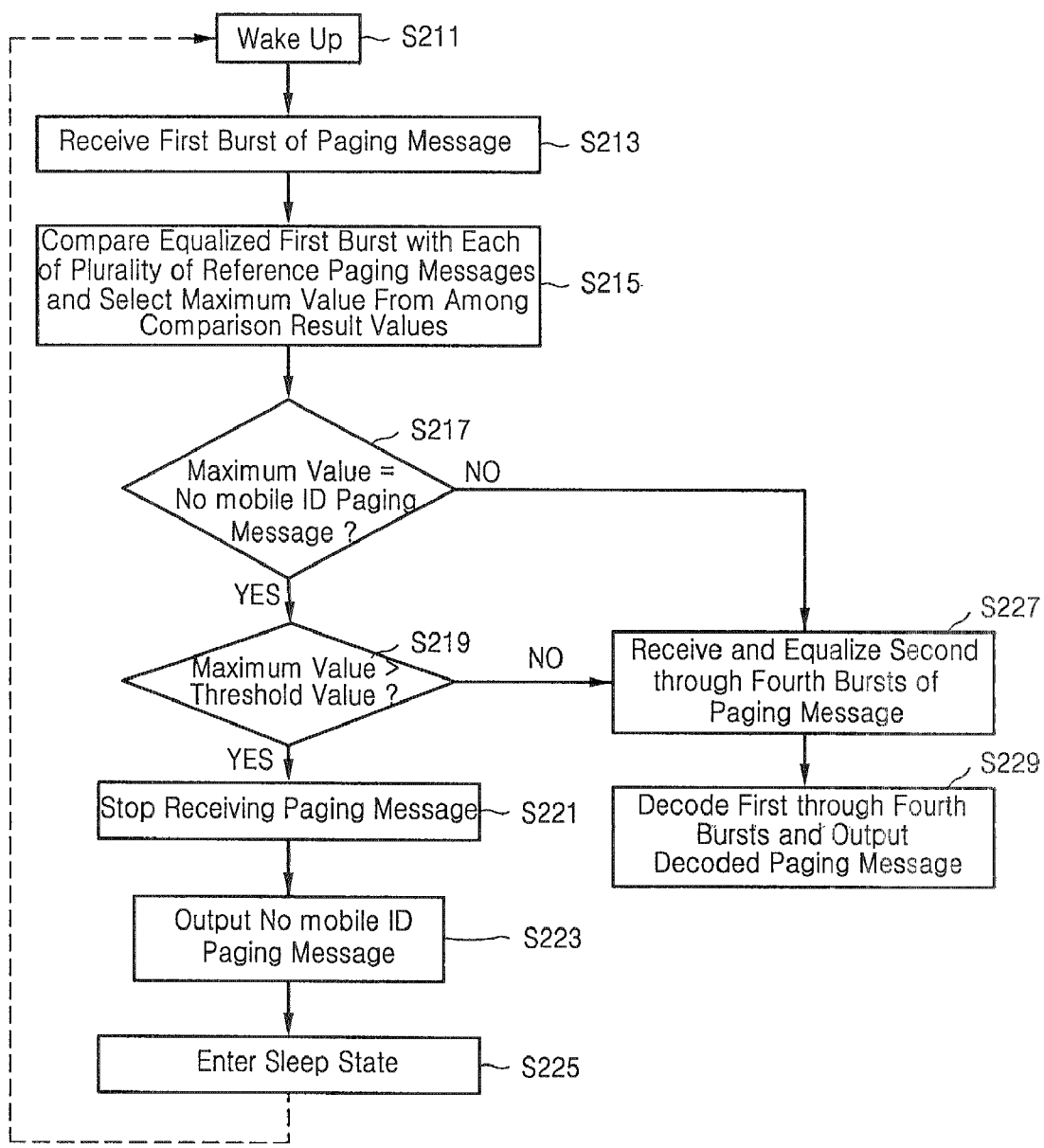
FIG. 4 is a flowchart of a method of decoding a transmitted paging message according to another embodiment of the present invention.

FIG. 3 is a block diagram of a receiver circuit in a mobile device 200 according to another embodiment of the present invention. FIG. 4 is a flowchart of another method of decoding a transmitted paging message performed by the mobile device 200 of FIG. 3. The mobile device 200 of FIG. 3 is the same as the mobile device 100 of FIG. 1 except that the decoded paging message output by the channel decoder 109 is not stored in the storage unit 112, and thus the reference paging message generator 107 in FIG. 1 is obviated and is absent from the mobile device 200 of FIG. 3. A method of decoding a paging message according to another embodiment of the present invention, performed by the mobile device 200 of FIG. 3 will be described below with reference to FIGS. 3 and 4.

In step S211, the mobile device 200 of FIG. 3 wakes up from a sleep state to periodically monitor a paging channel (PCH). In step S213, the transceiver 102 is enabled in response to the (activated) first control signal TCS and receives the first burst of a current paging message. In step S215, the equalizer 103 is enabled in response to the (activated) second control signal ECS, equalizes the first burst (of the current paging message) output from the transceiver 102, and outputs the equalized first burst EBD1 to the controller 105 and the controller 105 compares the equalized first burst EBD1 with each of a plurality of reference paging messages that have previously been received and/or stored (e.g., in a storage unit 112) and performs a selection based upon the maximum value from among the comparison result values.

In step S217, the controller 105 determines whether the maximum value among the comparison result values corresponds to a "no mobile ID paging message", which may be stored in a storage unit 112. The storage unit 112 may be implemented as a buffer, a database, register, a volatile memory device, or a non-volatile memory device.

If the maximum value corresponds with (e.g., is equal to) a no mobile ID paging message (branch "YES" from decision step S217), the controller 105 compares the maximum value with a threshold value in decision step S219. If the maximum value is greater than the threshold value (branch "YES" from decision step S219), the controller 105 deactivates the transceiver 102 by outputting the (deactivated) first control signal TCS, and the mobile device 200 of FIG. 3 stops receiving the current paging message. Accordingly, in step S221, the transceiver 102 does not receive the second through fourth burst of the paging message in response to the deactivated first control signal TCS. The controller 105 also outputs the activated selection signal SEL to the selection circuit 113. In step S223, in response to the activated selection signal SEL, the selection circuit 113 receives the no mobile ID paging message stored in the storage unit 112 through a first input terminal "1", and outputs it as the output signal DPM. In step S225, the controller 105 controls the mobile device 200 to enter the sleep state. Accordingly, electrical current (power) consumed by the mobile device 200 that decodes only the first burst of a paging message reduced, for example, to ¼ of electrical current (power) consumed by a conventional mobile device that decodes all first through fourth bursts of the paging message.

If the maximum value is greater than the threshold value (branch "YES" from decision step S219), the controller 105 may deactivate the transceiver 102 and the channel decoder 109 by outputting the deactivated first control signal TCS and the deactivated third control signal DCS, respectively.

If the maximum value is not the same as the no mobile ID paging message (branch "NO" from decision step S217) or if the maximum value is equal to or less than the threshold value (branch "NO" from decision step S219), in step S227 the controller 105 outputs the activated first control signal TCS to the transceiver 102 and thus the transceiver 102 sequentially receives and outputs the second through fourth burst of the paging message to the equalizer 103; The equalizer 103 sequentially equalizes the second through fourth bursts of the paging message in response to the activated second control signal ECS and outputs the equalized second through fourth bursts to the channel decoder 109. Alternatively, the equalizer 103 may output the equalized first through fourth bursts to the channel decoder 109. In step S229, the channel decoder 109 receives and decodes the equalized first through fourth bursts output from the equalizer 103 in response to the activated third control signal DCS and outputs a decoded paging message to input terminal "0" of the selection circuit 113, which outputs it as the output signal DPM. The selection circuit 113 outputs the paging message decoded by the channel decoder 109 as the output signal DPM in response to the deactivated selection signal SEL. The selection circuit 113 may output the output signal DPM to a subsequent block, for examples a Layer3.

In other words, the mobile device 200 may output only the no mobile ID paging message as a paging message, i.e., the output signal DPM, without receiving the second through fourth bursts of a current paging message or the mobile device 200 may receive and decode the first through fourth bursts and output the decoded paging message as the output signal DPM.

The mobile devices 100 and 200 can reduce electrical current (power) consumed in the transceiver, which receives a paging message, to ¼ of electrical current (power) consumed in a conventional mobile device and can reduce time taken to decode the paging message by 2 TDMA frames. As a result, electrical current (power) that would otherwise be dissipated to process 2 TDMA frames can be conserved.

Figure 5:
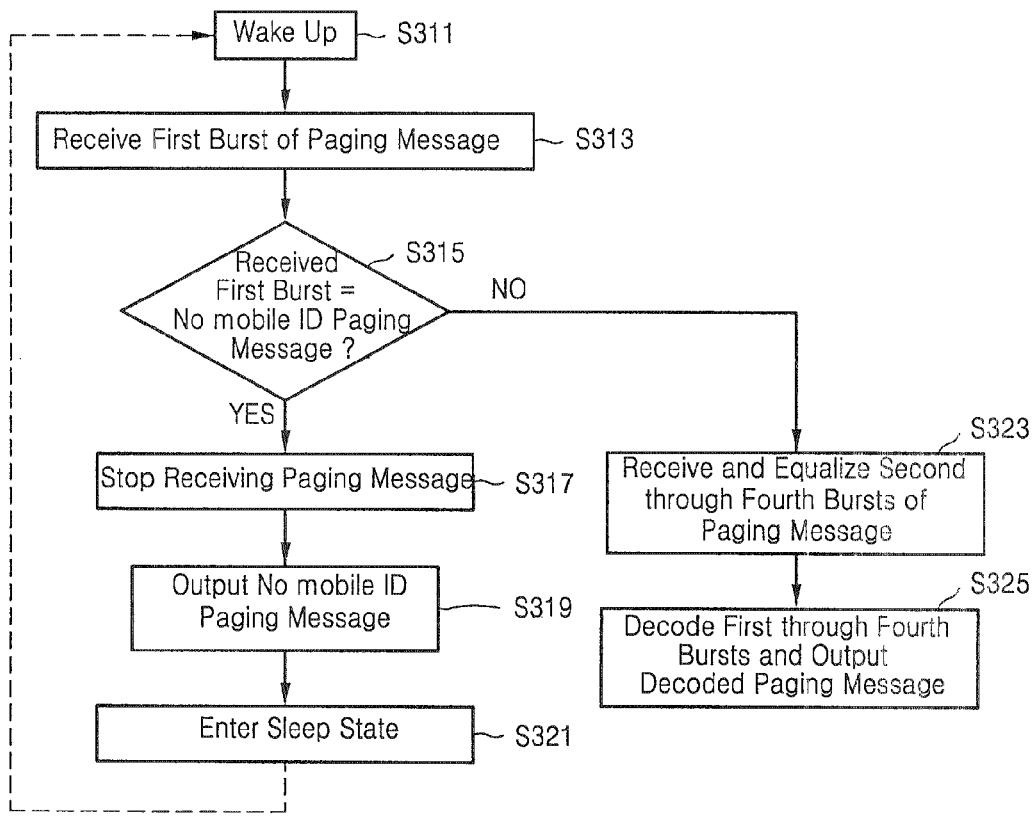
FIG. 5 is a flowchart of a method of decoding a transmitted paging message according to still another embodiment of the present invention.

FIG. 5 is a flowchart of a method of decoding a transmitted paging message according to still another embodiment of the present invention. A method of decoding a paging message according to still another embodiment of the present invention may be performed by the mobile device 200 of FIG. 3 and will be described below with reference to FIGS. 3 and 5.

In step S311, the mobile device 200 wakes up from a sleep state to periodically monitor a paging channel. In step S313, the transceiver 102 is enabled in response to the (activated)

first control signal TCS and receives the first burst of a paging message. The equalizer 103 is enabled in response to the (activated) second control signal ECS, equalizes the first burst output from the transceiver 102, and outputs the equalized first burst EBD1 to the controller 105.

In decision step S315, the controller 105 determines whether the equalized first burst EBD1 is the same as (the first burst of) a no mobile ID paging message. If the equalized first burst EBD1 is the same as the first burst of a no mobile ID paging message (branch "YES" from decision step S315), the first control signal TCS is deactivated in step S317 and thus the transceiver 102 does not receive the second through fourth bursts of the current paging message in response to the first control signal; the controller 105 activates and outputs the selection signal SEL to the selection circuit 113. And, in step S319, in response to the activated selection signal SEL, the selection circuit 113 may output the no mobile ID paging message, which is stored in the storage unit 112 connected to the first input terminal "1", as the output signal DPM. And, in step S321, the controller 105 controls the mobile device 200 to enter the sleep state.

If the equalized first burst EBD1 is not the same as the no mobile ID paging message (branch "NO" from decision step S315), the controller 105 activates and outputs the first control signal TCS to the transceiver 102 and thus the transceiver 102 sequentially receives the second through fourth bursts of the current paging message in response to the activated first control signal TCS and outputs them to the equalizer 103 in step S323. The equalizer 103 sequentially equalizes the second through fourth bursts in response to the activated second control signal and outputs the equalized second through fourth bursts to the channel decoder 109. Alternatively, the equalizer 103 may output the equalized first through fourth bursts to the channel decoder 109. In step S325, the channel decoder 109 receives and decodes the first through fourth bursts equalized by the equalizer 103 and outputs a decoded paging message.

The selection circuit 113 outputs the paging message decoded by the channel decoder 109 as the output signal DPM in response to the deactivated selection signal SEL. The selection circuit 113 may output the output signal DPM to a subsequent block.

In other words, the mobile device 200 may output only the no mobile ID paging message as a paging message, (i.e., the output signal DPM) without receiving the second through fourth bursts of a current paging message or the mobile device 200 may receive and decode the first through fourth bursts and output the decoded paging message as the output signal DPM.

As described above, according to the present invention electric current (power) needed to decode a paging message and decoding time can be reduced.

Various embodiments of the invention can also be embodied as computer executable codes (programs) stored on a computer readable recording medium. The computer readable recording medium may be any data storage device that can store data that can be thereafter read and/or executed by a computer system. The computer readable recording medium can also be distributed over network coupled computer systems so that the computer readable code is stored and executed in a distributed fashion. Also, functional programs, codes, and code segments for accomplishing the present invention can be easily implemented by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims. While the present invention has been particularly shown and described with reference to exemplary GSM embodiments, it will be understood by those of ordinary skill in the art that the invention may be practiced in other systems as well such as in GSM Packet Radio Service (GPRS) systems (e.g., for the GPRS packet Paging Channel (PPCH) and the Packet Broadcast Control CHannel (PBCCH)). In the PBCCH system, a message comprised of a Packet Paging Channel message is interleaved over a plurality of transmission bursts.

What is claimed is:

1. A mobile device comprising:
 a receiver configured to receive a first control signal and selectively receive only a first burst among four bursts of a paging message based on a state of the first control signal;
 an equalizer configured to equalize at least one of the bursts;
 a channel decoder configured to decode at least one of the equalized bursts and receive a second control signal; and
 a controller configured to:
  compare the equalized first burst with a reference paging message to generate a first comparison result value and to compare the first comparison result value with a threshold value,
  generate the first control signal for controlling reception of second through fourth bursts of the paging message based on a result of comparing the first comparison result value with the threshold value,
  generate the second control signal to disable the channel decoder when the reception of the second through fourth bursts is prevented and enable the channel decoder otherwise, and
  generate a selection signal to output one of a first decoded message based on bursts received prior to the first through fourth bursts when the decoder is disabled and a second decoded message based on the first through fourth bursts when the decoder is enabled,
  wherein if the first comparison result value is greater than the threshold value, then the controller outputs the first control signal in a deactivated state to the receiver to control the receiver to not receive the second through fourth bursts of the paging message.

2. The mobile device of claim 1, wherein if the comparison result value is equal to or less than the threshold value, then the controller outputs the first control signal in an activated state to the receiver to control the receiver to receive the second through fourth bursts of the paging message.

3. The mobile device of claim 1, further comprising:
 a storage unit for storing a paging message decoded by the channel decoder;
 a reference paging message generator for encoding at least the first burst of the decoded paging message stored in the storage unit and for providing the encoded first burst as the reference paging message; and
 a selection circuit configured to output one of the first decoded paging message stored in the storage unit and the second decoded paging message output from the channel decoder, in response to the selection signal output from the controller.

4. The mobile device of claim 1, wherein the controller performs a correlation of the first burst equalized by the equalizer and the reference paging message, and compares a correlation result value of the correlation with the threshold value, and generates the first control signal for controlling the reception of the second through fourth bursts of the paging message based on a result of comparing the correlation result value with the threshold value.

5. The mobile device of claim 1, wherein the controller compares the first burst equalized by the equalizer with the reference paging message bit to bit, compares the total bit difference with the threshold value, and generates the first control signal for controlling the reception of the second through fourth bursts of the paging message based on a result of comparing the bit difference with the threshold value.

6. A mobile device comprising:
- a receiver configured to receive a first control signal and selectively receive only a first burst among four bursts of a paging message based on a state of the first control signal;
- an equalizer configured to equalize at least one of the bursts;
- a channel decoder configured to decode at least one of the equalized bursts and receive a second control signal; and
- a controller configured to:
  - compare the equalized first burst with a reference paging message to generate a first comparison result value and to compare the first comparison result value with a threshold value,
  - generate the first control signal for controlling reception of second through fourth bursts of the paging message based on a result of comparing the first comparison result value with the threshold value,
  - generate the second control signal to disable the channel decoder when the reception of the second through fourth bursts is prevented and enable the channel decoder otherwise, and
  - generate a selection signal to output one of a first decoded message based on bursts received prior to the first through fourth bursts when the decoder is disabled and a second decoded message based on the first through fourth bursts when the decoder is enabled,
- wherein if the comparison result value is equal to or less than the threshold value, then the controller outputs the first control signal in an activated state to the receiver to control the receiver to receive the second through fourth bursts of the paging message.

* * * * *